Patented May 22, 1928.

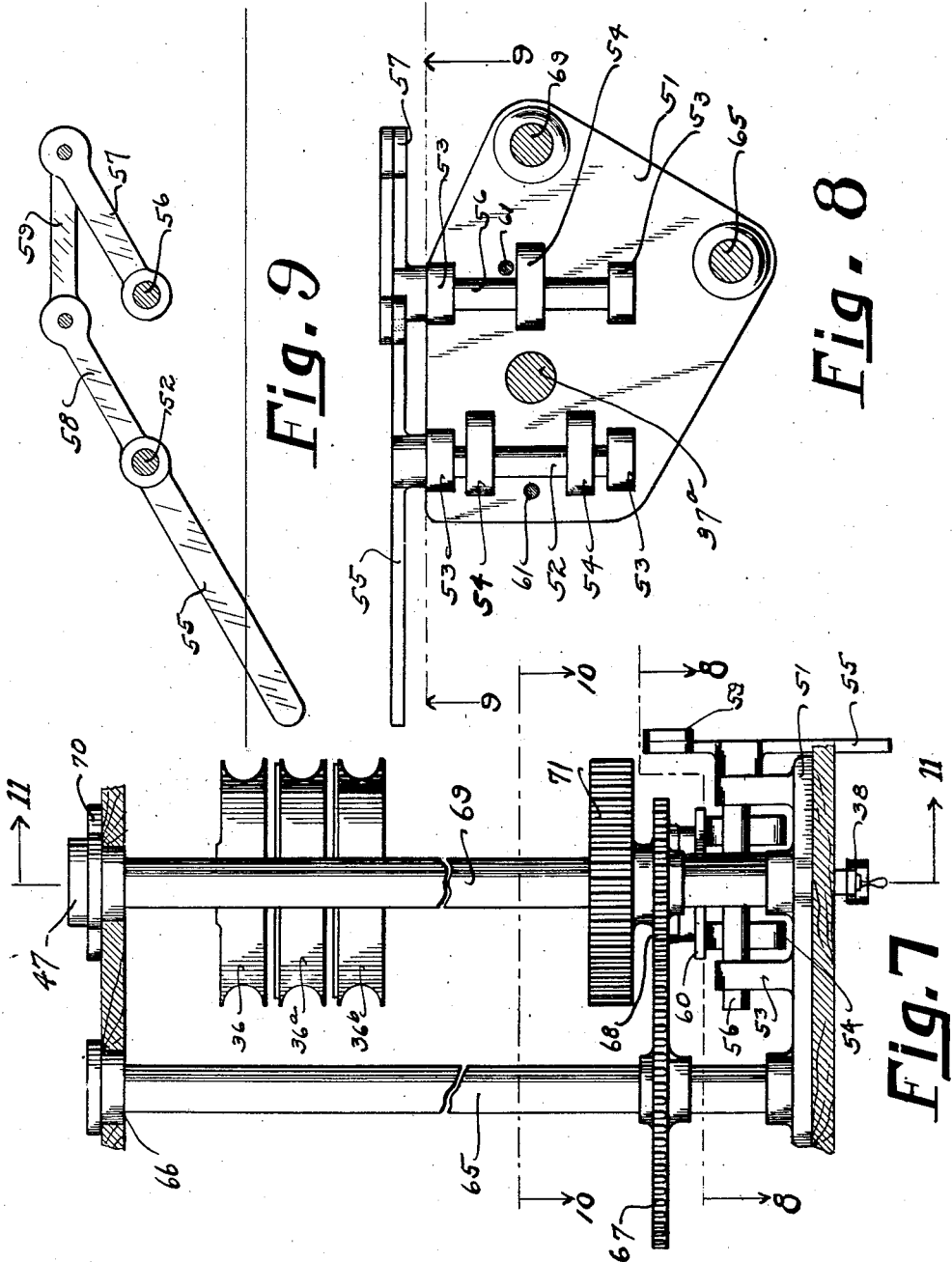

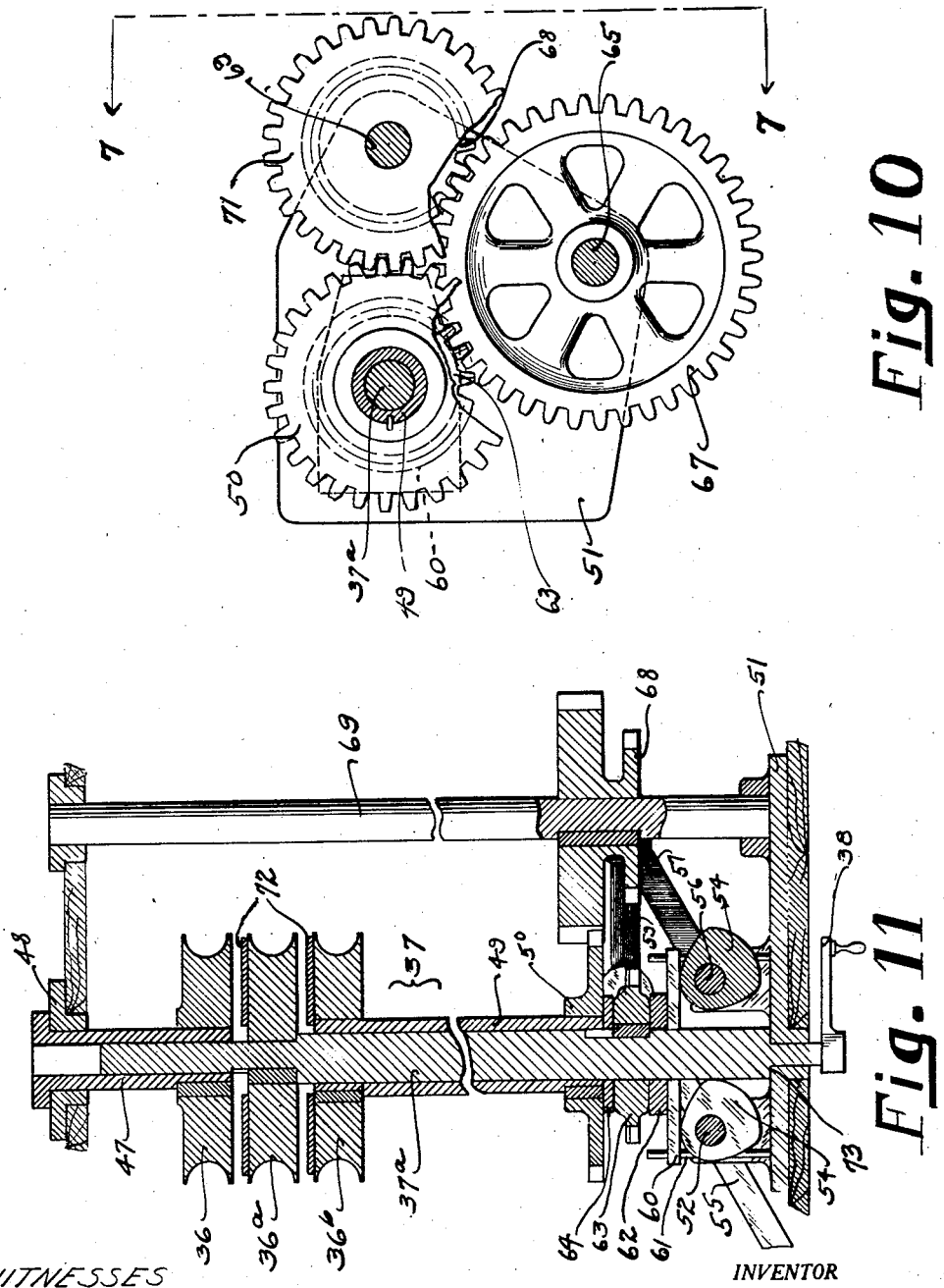

1,670,852

UNITED STATES PATENT OFFICE.

HARLAN DAVEY FOWLER, OF SOUTHAMPTON, PENNSYLVANIA.

AEROFOIL.

Application filed April 22, 1927. Serial No. 185,702.

My invention relates to aircraft and especially to the type of aircraft embodying one or more aerofoils or aerial supporting and lifting planes or wings having upper and lower surfaces which are usually cambered or curved to give the required lift, the latter ordinarily depending on the speed of the craft, power of the motor or other conditions.

The principal object of my invention is to provide, in conjunction with such aerofoil, novel and efficient means under the control of the operator for varying the area, chord, camber and angle of incidence thereof and incidentally controlling the aspect ratio and movement of the center of pressure. The arrangement enables the speed of the craft to be changed and regulated at the will of the aviator and thereby provides for a low and safe landing and launching speed.

Another object of my invention is to provide means under the control of the operator which may be used as an auxiliary stabilizer and elevator control surface, thereby greatly increasing the longitudinal controlability of the craft.

Still another object of my invention is to provide means under the control of the operator for increasing the lift at either end of the aerofoil independently of the other end thereof, thus greatly increasing the lateral controllability of the craft.

These objects, and other advantageous ends which will be described hereinafter, I attain in the following manner, reference being had to the accompanying drawings in which Figure 1 is a top plan view, partly broken away, of an aerofoil embodying my invention, and Figure 2 an enlarged cross sectional view, taken substantially on line 2—2 on Figure 1, but showing the auxiliary wing disposed under the trailing edge of the main wing.

Figure 3 is an enlarged cross sectional view taken on line 3—3 on Figure 1, and

Figure 4 an enlarged view, partly in section, taken substantially on line 4—4 on Figure 3; the covering of the auxiliary wing being omitted for the sake of simplicity.

Figure 7 is an enlarged fragmentary view, taken substantially on line 7—7 on Figure 1, showing a portion of the operating mechanism.

Figure 8 is a sectional plan view taken on line 8—8 on Figure 7; and

Figure 1:
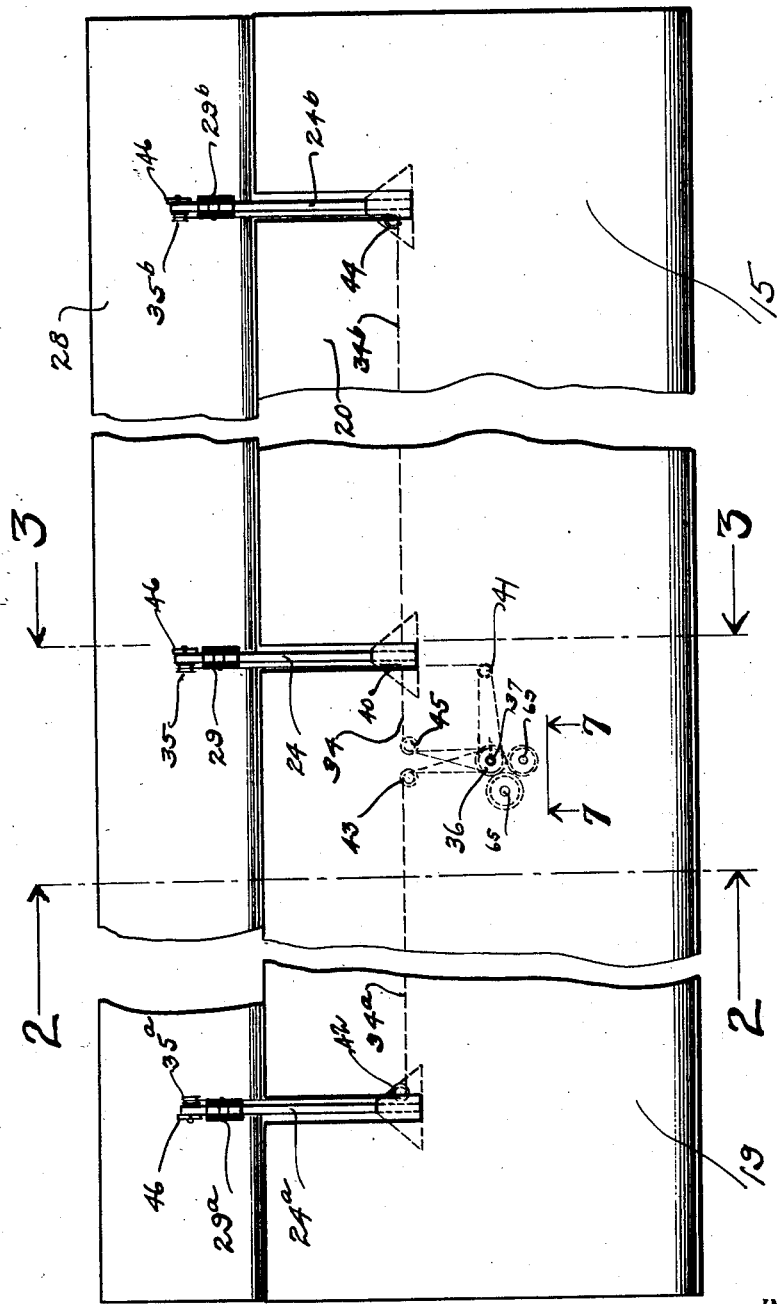

Figure 9 a view taken on line 9—9 on Figure 8.

Figure 10 is a view taken on line 10—10 on Figure 7, and

Figure 11 a view taken on line 11—11 on Figure 7.

My invention is adapted to be applied to aerofoils regardless of their camber, chord or other characteristics and any approved type of construction may be employed providing that the frame of the main wing has sufficient strength and rigidity to support the auxiliary wing area and withstand the thrusts and loads transmitted therefrom. For the purpose of illustration, I have shown it applied to a main wing 15 having a leading spar 16 and a trailing spar 17 which are held in spaced relation to one another by sturdy compression ribs 18, thus forming the main frame of the principal part 19 of the wing. A trailing portion 20, of considerably smaller cross sectional area, is secured to principal part 19 in any approved manner and the entire wing 15 covered with fabric or veneer 21 supported on inferior ribs 22, as is customary in the manufacture of aircraft; the upper surface of trailing portion 20 being a continuation of the upper surface of principal part 19, while its lower surface is sharply offset from the lower surface of principal part 19 in order to accommodate an auxiliary wing as will be described hereinafter.

As the construction of aerofoils is well known in the art, it is not believed necessary to illustrate or describe specific structural characteristics aside from the primary requisites of providing sturdy compression ribs and spars; the trailing spar preferably being prevented from turning over by suitable wire cross braces 23.

Figure 5:
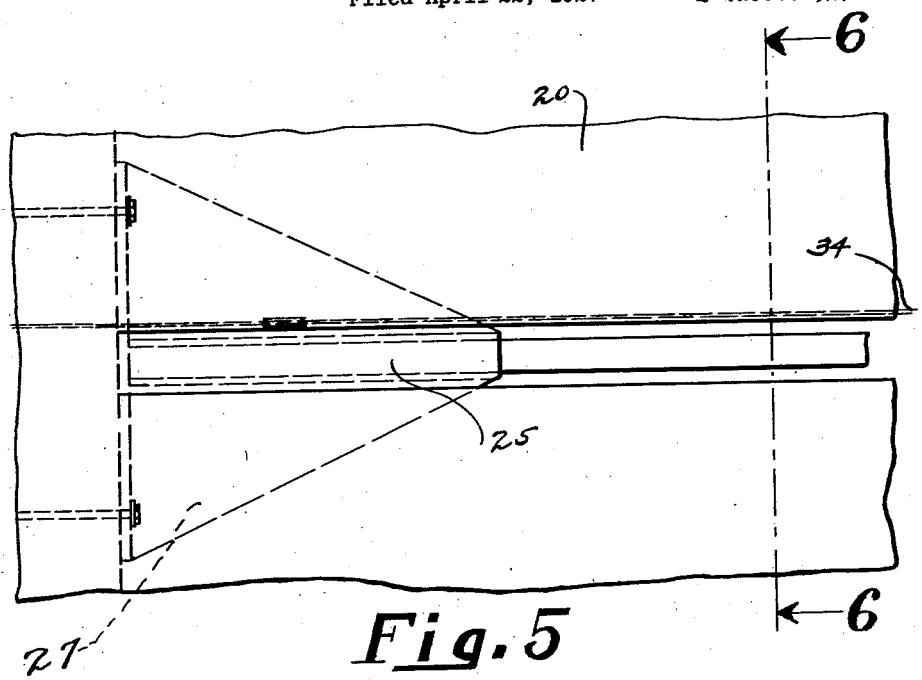
Figure 5 is an enlarged fragmentary top plan view, taken substantially on line 5—5 on Figure 3, and Figure 6 a fragmentary sectional view taken on line 6—6 on Figure 5.
Figure 6:
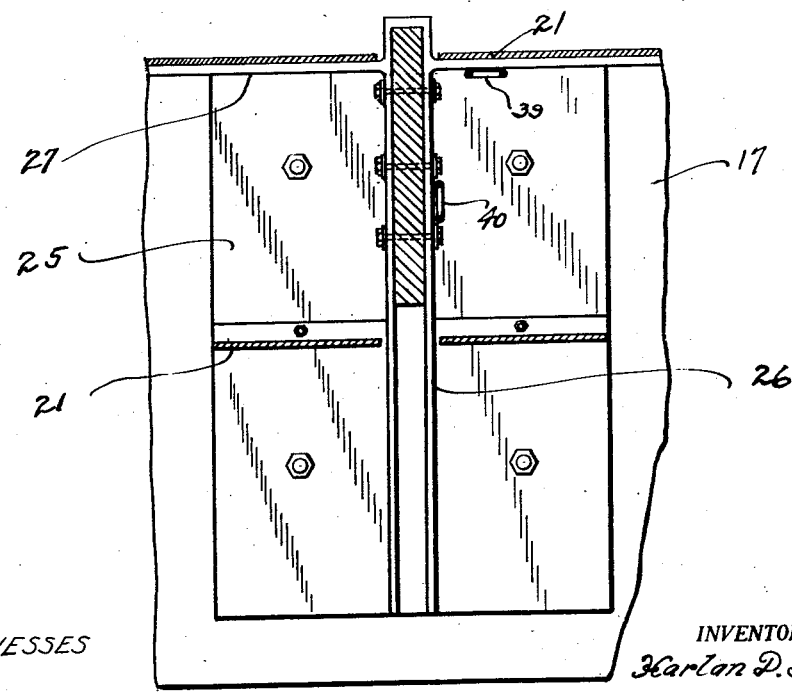

I have shown trailing portion 20 as being slotted at three points to accommodate trolley beams 24 which are secured to trailing spar 17 by flanged castings 25. Each casting 25, which is preferably secured to spar 17 opposite one of the compression ribs 18, is provided with a pair of vertical flanges 26, between which trolley beam 24 is secured and which transfer vertical loads from the beam to the spar, and with a pair of horizontal flanges 27 which stiffen the beam against lateral movement, as shown in Figures 5 and 6.

Figure 4:
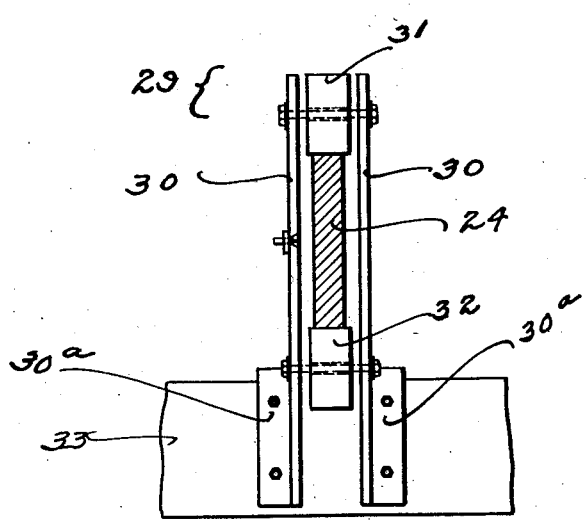

An auxiliary wing 28, which extends substantially the entire length of wing 15, is movably mounted on trolley beams 24 by means of trolleys 29, each of which consists of a pair of plates 30, an upper roller 31 and two lower rollers 32. Roller 31 is adapted to ride on top of beam 24 and carry the weight of auxiliary wing 28, while rollers 32 engage the bottom of beam 24 and hold auxiliary wing 28 against upward movement and against canting. The lower part of each plate 30 is notched and flanged and straddles a beam 33, which runs the entire length of auxiliary wing 28 and which is bolted to flanges 30$^a$ formed on plate 30. This construction is plainly shown in Figures 2 and 4.

Figure 2:
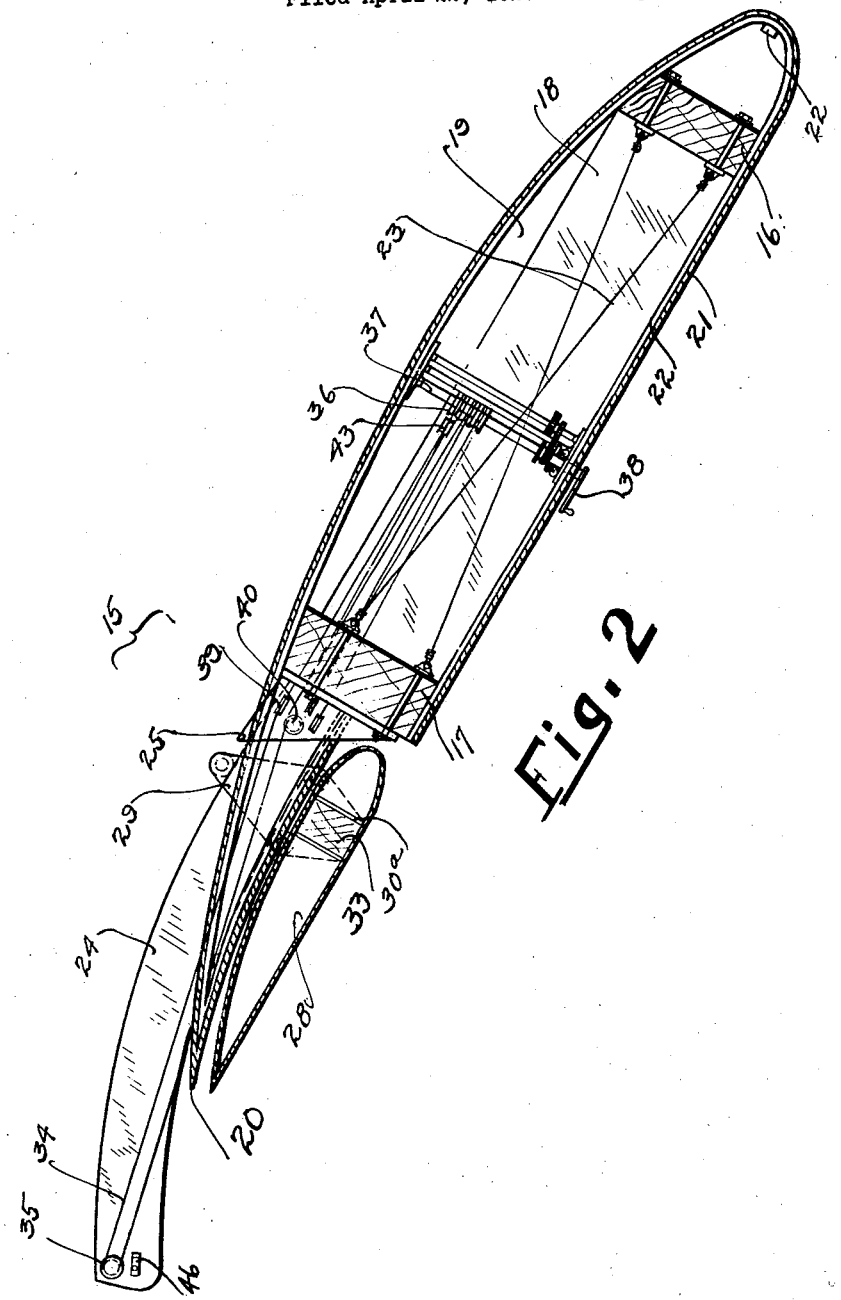

When auxiliary wing 28 is disposed below trailing portion 20, as shown in Figure 2, its under surface is in line with or forms a continuation of the curvature of the underside of principal part 19 and is adapted to be moved on trolley beams 24 in the following manner: An endless cable 34 is secured to one side of the center trolley 29, passed over a deflector sheave 35 mounted on the outer end of center trolley beam 24, then carried inwardly to a point immediately above the operator's seat and given one or more turns around a drum 36 secured to a shaft 37 rotatably mounted in principal part 19 and provided with a handle 38 by means of which it may be rotated; cable 34 being led over suitable deflector sheaves 39, 40 and 41 to give it the required changes in direction. An endless cable 34$^a$, attached to trolley 29$^a$ on trolley beam 24$^a$ at one end of the wing, is led over a deflector sheave 35$^a$ on the end of the beam, then over deflector sheaves 42 and 43 and given one or more turns around a drum 36$^a$ on shaft 37. An endless cable 34$^b$ is attached to trolley 29$^b$ on trolley beam 24$^b$ at the other end of the wing, led over deflector sheave 35$^b$ on the end of the beam, then over sheaves 44 and 45 and given one or more turns around drum 36$^b$ on shaft 37. The only difference in the above mechanisms being the length and manner of running the cables and the manner of mounting of the drums on shaft 37.

Figure 3:
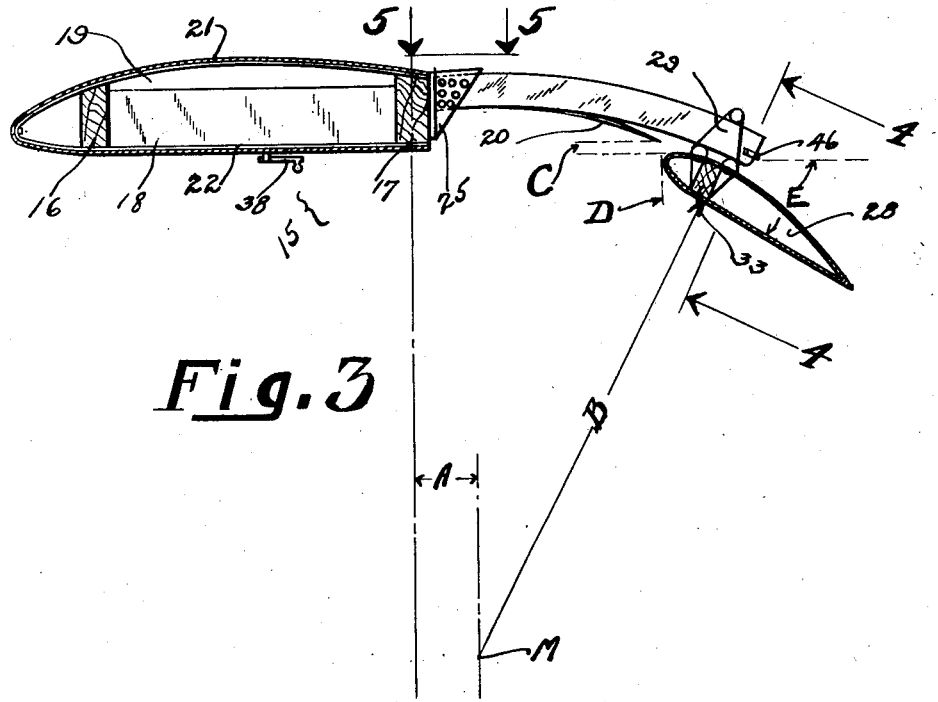

The full intent and purpose of this invention is to increase the lifting power of a wing by so extending the auxiliary wing 28 rearwardly along a curvature of a radius B, whose point M is situated to trailing spar 17 by a dimension A (see Fig. 3). When moved back until retained by stop 46, auxiliary wing 28 must maintain a definite position relative to the trailing edge of the main wing, as indicated by the opening C and position line D, and an angle E relatively to the main wing, all of which are predetermined from the characteristics of main wing 15, and combining with these the increase in area, camber, and angle of incidence for the resultant wing.

With drums 36 locked on shaft 37, it is evident that rotating handle 38 will cause drums 36 to rotate and draw in one side of each cable 34 and allow the other side to run outwardly and, as each cable is connected to a trolley 29, this movement will cause the trolleys to move longitudinally of trolley beams 24 and consequently move auxiliary wing 28 outwardly from under trailing portion 28 or vice versa; a stop 46 being provided at the outer end of each trolley beam for limiting the outward movement of the trolleys.

Assuming that an aircraft having my invention installed thereon has landed, it may take off in the usual manner but it is intended that the operator will move auxiliary wing 28 rearwardly on trolley beams 24, thus increasing his wing area and, as trolley beam 24 is of such curvature that auxiliary wing 28 forms a continuation of the cambered surfaces as it moves rearwardly, the wing area, chord and camber are increased and the craft given greater lifting power; thus allowing the aviator to take off from a much smaller field or to rise with a greatly increased load.

As the craft rises in free flight, auxiliary wing 28 is drawn under trailing portion 20, thus decreasing the area of the aerofoil with the attending change in camber and angle of incidence, reducing the head resistance and thereby increasing the speed of the craft until the auxiliary wing is drawn entirely under trailing portion 20; at which time the craft developes its maximum speed.

In landing, the above operation is reversed, i. e. auxiliary wing 28 is extended until the wing area is increased to the desired extent and the speed of the craft reduced due to the drag of the extended auxiliary wing. The increased wing area allows landing at a much lower speed than would be possible with a normal wing area, and consequently provides a much safer landing than is ordinarily possible.

My invention may also be used for controlling the craft when in flight. If it is desired to nose the craft over, auxiliary wing 28 may be extended to raise the trailing edge of the wing and thus depress the nose of the craft. This operation may be performed in conjunction with or independently from the regular elevator control. Oftentimes it is desired to turn to the right or left at a relatively sharp angle which necessitates banking the plane and my invention is adapted to give material assistance in this respect. If the aviator desires to turn to the right, he extends the left hand end of auxiliary wing 28 while the right had end is fully withdrawn under trailing portion 20; the extended end producing a decided lift on that end of the aerofoil.

The moving of one end of auxiliary wing 28 outwardly while the other end remains under trailing portion 20 may be accomplished in a number of ways. One manner of accomplishing this end is to employ certain mechanism whereby the drums may be revolved in unison or the direction of rotation of one of the drums changed from that of another and allowing a third drum to remain stationary. By referring to Figures 8 to 11, it will be noted that shaft 37 is composed of a main shaft 37ª and an upper quill shaft 47, which is rotatably mounted in a bearing 48, suitably mounted in the framework of wing 15. Drum 36 is fixed to quill 47 and drum 36ª to main shaft 37ª, while drum 36ᵇ is secured to a quill 49 rotatably mounted on shaft 37ª and having a gear 50 fixed to its lower end. The lower end of shaft 37ª is reduced in diameter and rotatably mounted in a bearing formed in a casting 51.

A cam shaft 52, rotatably mounted in bearings 53 formed on casting 51, is provided with two cams 54 and has an operating handle 55 secured to its outer end. A second shaft 56, also rotatably mounted in a pair of bearings 53, has a cam 54 secured thereon and a lever 57 fixed to its outer end. A lever 58 is fixed to shaft 52 or formed integral with handle 55 and a link 59 connects the upper end of levers 57 and 58 respectively. It will be evident that moving handle 55 will rotate shaft 52 and the cams 54 fixed thereon and, as link 59 connects shafts 52 and 56, the cam 54 on shaft 56 will be rotated in unison with the cams on shaft 52.

A bearing plate 60, provided with a central aperture through which shaft 37ª extends, is disposed on cams 54 and held against rotation by pins 61 fixed in casting 51. A bearing ring 62 encircles shaft 37ª and is disposed between plate 61 and a gear 63 which is slidably keyed to shaft 37ª and separated from gear 50 by a bearing ring 64. While bearing rings 62 and 64 have been shown, it is understood that roller or ball bearings may be employed if so desired.

An idler shaft 65, rotatably mounted in casting 51 and in a bearing 66 suitably secured in the framework of wing 15, has a gear 67 fixed thereon which meshes with gear 63 and with a gear 68, similar to gear 63, fixed to a shaft 69 rotatably mounted in casting 51 and in a bearing 70 suitably secured in the frame of wing 15. A gear 71 is also fixed to shaft 69 and meshes with gear 50 on quill 49.

When it is desired to extend auxiliary wing 28 for its entire length, handle 55 is pulled downwardly to raise the cam faces on cams 54 and move plate 60 upwardly and slide gear 63 on shaft 37ª until it is out of mesh with gear 67. Continued movement of cams 54 will cause drums 36, 36ª and 36ᵇ to lock together due to the action of clutch disks 72 secured to adjacent faces of the drums. Now by turning handle 38, all three drums will be rotated in unison as drum 36ª is keyed to shaft 37ª and drums 36 and 36ᵇ locked thereto by the action of cams 54 forcing clutch disks 72 against the faces of the adjacent drums.

When it is desired to extend one end of auxiliary wing 28 and draw the other end under trailing portion 20, the procedure is as follows: Handle 38 is rotated until trolleys 29 are approximately centrally disposed longitudinally of trolley beams 24, handle 55 is then moved to rotate cams 54 and lower bearing plate 60 which will allow shaft 37ª and quill shaft 49 to move downwardly. Shaft 37ª will then be supported by shoulders 73, formed by the reduced portion of the shaft, resting on casting 51 while quill 49 will be supported by plate 60, ring 62, gear 63 and ring 64. This will cause the drums to be separated from one another and will cause gear 63 to mesh with gear 67. Rotation of handle 38 will rotate gear 63 and drum 36ª in one direction and drum 36ᵇ in the opposite direction through the action of gears 63, 67, 68, 71 and 50, while drum 36 remains stationary due to quill 47 being rotatably mounted on shaft 37ª. It will be noted that gear 71 is considerably thicker than gear 50 so that these two gears do not come out of mesh, thus making it necessary to mesh gear 63 with gear 67 only and this is facilitated by tapering the bottoms of the teeth on gear 63 and the tops of the teeth on gear 67. It is also to be understood that the gears are of such ratio that drums 36ª and 36ᵇ are rotated at the same speed.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An aerofoil including a cambered normal wing consisting of a main portion and a trailing portion of substantially smaller cross-sectional area, and an auxiliary wing adapted to be faired under the trailing portion and to be projected rearwardly and downwardly.

2. An aerofoil including a cambered normal wing having upper and lower surfaces and consisting of a main portion and a trailing portion of substantially smaller cross-sectional area, and an auxiliary wing adapted to be faired under the trailing portion and to be projected rearwardly and downwardly while maintaining the stream line of the upper surface.

3. An aerofoil including a cambered normal wing having upper and lower surfaces and consisting of a main portion and a trailing portion of substantially smaller cross-sectional area, and an auxiliary wing adapted to be faired under the trailing portion and to be projected rearwardly and downwardly while maintaining the stream line of the upper surface; the under surface being partly opened at the rear.

4. An aerofoil including a cambered normal wing consisting of a main portion and a trailing portion of substantially smaller cross-sectional area, and an auxiliary wing adapted to be faired under the trailing portion and to be projected rearwardly and downwardly on a fixed radius whereby the lifting power of the aerofoil will be increased.

5. An aerofoil including a cambered normal wing having upper and lower surfaces and a trailing portion, an auxiliary wing adapted to be faired under the trailing portion, and means for positively projecting the auxiliary wing outwardly and downwardly relatively to the trailing portion.

6. An aerofoil including a cambered normal wing having upper and lower surfaces and a trailing portion, an auxiliary wing adapted to be faired under the trailing portion, and means for positively projecting the auxiliary wing outwardly and downwardly relatively to the trailing portion and for maintaining the auxiliary wing in spaced relation with the trailing portion.

7. An aerofoil including a normal wing having upper and lower surfaces and a trailing portion, an auxiliary wing adapted to be faired under the trailing portion with its bottom forming a continuation of said lower surface, and means for projecting and retracting the auxiliary wing relatively to the trailing portion.

8. An aerofoil including a cambered normal wing having upper and lower surfaces and a trailing portion, an auxiliary wing adapted to be faired under the trailing portion with its bottom forming a continuation of said lower surface, and means for projecting the auxiliary wing outwardly and downwardly whereby its bottom will be disposed at an angle to said lower surface and its top maintain the stream line of said upper surface.

9. An aerofoil for aircraft including a cambered normal wing consisting of a main portion and a trailing portion of substantially smaller cross-sectional area, and an auxiliary wing adapted to have either or both ends faired under the trailing portion and to have either or both ends projected rearwardly and downwardly.

10. An aerofoil for aircraft including a main wing having a trailing portion, an auxiliary wing movably connected to the main wing and normally disposed under the trailing portion, and means for projecting and retracting the auxiliary wing whereby the lifting power and longitudinal controlability of the craft is increased.

11. An aerofoil for aircraft including a main wing having a trailing portion, an auxiliary wing movably connected to the main wing and normally disposed under the trailing portion, and means for projecting and retracting either or both ends of the auxiliary wing whereby the lifting power, longitudinal controlability and lateral controlability of the craft is increased.

12. An aerofoil including a normal wing having a main portion and a slotted trailing portion, trolley beams secured to the main portion and extending through the slots in the trailing portion, trolleys on the beams, an auxiliary wing secured to the trolleys, and means for projecting and retracting the auxiliary wing.

13. An aerofoil including a normal wing having a main portion and a slotted trailing portion, trolley beams secured to the main portion and extending through the slots in the trailing portion, trolleys on the beams, an auxiliary wing secured to the trolleys, and means for projecting and retracting either or both ends of the auxiliary wing.

14. An aerofoil including a cambered normal wing having a main portion and a slotted trailing portion, trolley beams secured to the main portion and extending through the slots in the trailing portion, trolleys on the beams, an auxiliary wing secured to the trolleys, means for projecting and retracting the auxiliary wing; the trolley beams being so cambered that the top of the auxiliary wing maintains the stream line of the top of the main wing when said auxiliary beam is projected.

15. An aerofoil including a normal wing having a main portion and a slotted trailing portion, beam supports secured to the main portion, trolley beams secured in said supports and extending through the slots in the trailing portion, flanges on the beam supports for stiffening the trolley beams, trolleys on the beams, an auxiliary wing secured to the trolleys, and means for projecting and retracting the auxiliary wing.

16. An aerofoil including a normal wing having a main portion and a slotted trailing portion, a trolley beam secured to the main portion and extending through the trailing portion, a trolley on the beam, a drum rotatable in the main portion, a sheave on the outer end of the beam, an endless cable attached to the trolley and encircling the drum and the sheave, and means for rotating the drum.

17. An aerofoil including a normal wing having a main portion and a slotted trailing portion, trolley beams secured to the main portion and extending through the slots in the trailing portion, trolleys on the beams an auxiliary wing secured to the trolleys, a sheave rotatable on the outer end of each beam, drums rotatable in the main portion, an endless cable attached to each trolley and encircling one of the sheaves and one of the drums, and means for rotating one drum in one direction and another drum in the opposite direction.

18. In an aerofoil having a main wing, beams secured to the main wing, trolleys on the beams and an auxiliary wing secured to the trolleys; means for moving both ends of the auxiliary wing in unison or in opposite directions including a shaft, a drum and a driving gear keyed to the shaft, a quill rotatable on the shaft, a drum and a driven gear fixed on the quill, clutch faces on the drums, transfer gears meshing with the driving and driven gears, endless cables encircling the drums and attached to the trolleys, means for raising and lowering the shaft and the quill, and means for rotating the shaft.

19. In an aerofoil having a main wing, beams secured to the main wing, trolleys on the beams and an auxiliary wing secured to the trolleys; means for moving both ends of the auxiliary wing in unison or in opposite directions including a sleeve rotatable in the main wing and held against downward movement, a drum on the sleeve, a shaft rotatable in the sleeve and in the bottom of the main wing, a drum and a driving gear keyed to the shaft, a quill rotatable on the shaft, a drum and a driven gear fixed on the quill, clutch faces on the drums, transfer gears meshing with the driving and driven gears, endless cables encircling the drums and attached to the trolleys, means for raising and lowering the shaft and the quill, and means for rotating the shaft.

20. In an aerofoil having a main wing, beams secured to the main wing, trolleys on the beams and an auxiliary wing secured to the trolleys; means for moving both ends of the auxiliary wing in unison or in opposite directions including upper and lower bearings in the main wing, a sleeve rotatable in the upper bearing, a drum on the sleeve, a shaft rotatable in the bearings, a drum and a driving gear keyed to the shaft, a quill rotatable on the shaft, a drum and a driven gear fixed on the quill, clutch faces on the drums, transfer gears meshing with the driving and driven gears, endless cables encircling the drums and attached to the trolleys, cams rockable on the lower bearing, a plate resting on the cams and supporting the driving gear and the quill, means for rocking the cams, and means for rotating the shaft.

In testimony whereof I have signed my name to this specification.

HARLAN D. FOWLER.